(12) United States Patent
Fu et al.

(10) Patent No.: US 11,271,859 B2
(45) Date of Patent: Mar. 8, 2022

(54) METHOD AND APPARATUS FOR REALIZING INTELLIGENT TRAFFIC SCHEDULING, COMPUTER READABLE STORAGE MEDIUM THEREOF AND COMPUTER DEVICE

(71) Applicant: GUIZHOU BAISHANCLOUD TECHNOLOGY CO., LTD., Guiyang (CN)

(72) Inventors: Lijia Fu, Guiyang (CN); Hui Miao, Guiyang (CN)

(73) Assignee: GUIZHOU BAISHANCLOUD TECHNOLOGY CO., LTD., Gutyang (CN)

( * ) Notice: Subject to any disclaimer, the term of this patent is extended or adjusted under 35 U.S.C. 154(b) by 3 days.

(21) Appl. No.: 16/641,597

(22) PCT Filed: Aug. 24, 2018

(86) PCT No.: PCT/CN2018/102176
§ 371 (c)(1),
(2) Date: Feb. 24, 2020

(87) PCT Pub. No.: WO2019/037771
PCT Pub. Date: Feb. 28, 2019

(65) Prior Publication Data
US 2020/0195562 A1 Jun. 18, 2020

(30) Foreign Application Priority Data
Aug. 25, 2017 (CN) .......................... 201710744272.6

(51) Int. Cl.
*H04L 47/22* (2022.01)
*H04L 43/08* (2022.01)
(Continued)

(52) U.S. Cl.
CPC .............. *H04L 47/22* (2013.01); *H04L 43/08* (2013.01); *H04L 47/2441* (2013.01); *H04L 47/2483* (2013.01); *H04L 47/6215* (2013.01)

(58) Field of Classification Search
CPC ..... H04L 43/08; H04L 47/22; H04L 47/2441; H04L 47/2483; H04L 47/6215; H04L 67/1023
See application file for complete search history.

(56) References Cited

U.S. PATENT DOCUMENTS

| 6,175,869 B1 * | 1/2001 | Ahuja ................. H04L 67/1008 709/203 |
| 6,446,200 B1 * | 9/2002 | Ball .................... H04L 41/5038 713/1 |

(Continued)

FOREIGN PATENT DOCUMENTS

| CN | 102347976 A | 2/2012 |
| CN | 103777737 A | 5/2014 |

(Continued)

OTHER PUBLICATIONS

World Intellectual Property Organization (WIPO) International Search Report for PCT/CN2018/102176 dated Nov. 27, 2018 5 Pages.

(Continued)

*Primary Examiner* — Melanie Jagannathan
(74) *Attorney, Agent, or Firm* — Anova Law Group, PLLC (57) ABSTRACT

A method for network traffic scheduling includes determining a distribution of monitoring servers of an application server in one or more service network areas of the application server and in one or more network areas out of the one or more service network areas, in response to determining that the distribution satisfies a preset distribution condition, modifying a mapping relationship between the application server and the monitoring servers to obtain an updated (Continued)

mapping relationship according to the distribution, performing monitoring according to the updated mapping relationship, and modifying a service network area coverage scheme of the application server according to a result of the monitoring.

17 Claims, 2 Drawing Sheets

(51) Int. Cl.
*H04L 47/2441* (2022.01)
*H04L 47/2483* (2022.01)
*H04L 47/62* (2022.01)

(56) References Cited

U.S. PATENT DOCUMENTS

| | | | | |
|---|---|---|---|---|
| 8,086,709 | B2* | 12/2011 | Danne | H04L 65/1043 |
| | | | | 709/223 |
| 9,306,870 | B1 | 4/2016 | Klein et al. | |
| 10,505,818 | B1* | 12/2019 | Yona | H04L 43/16 |
| 10,530,935 | B1* | 1/2020 | Britt | H04L 43/045 |
| 11,212,231 | B2* | 12/2021 | Ishii | H04L 47/2483 |
| 2003/0198190 | A1* | 10/2003 | Rajan | H04L 43/08 |
| | | | | 370/252 |
| 2004/0139194 | A1* | 7/2004 | Naganathan | H04L 43/0817 |
| | | | | 709/224 |
| 2008/0033900 | A1 | 2/2008 | Zhang et al. | |
| 2008/0049614 | A1* | 2/2008 | Briscoe | H04L 41/0806 |
| | | | | 370/230 |
| 2013/0077486 | A1* | 3/2013 | Keith | H04L 47/22 |
| | | | | 370/230.1 |
| 2015/0058466 | A1* | 2/2015 | Cha | H04L 47/2483 |
| | | | | 709/223 |
| 2017/0207956 | A1* | 7/2017 | Cabral | H04L 41/082 |
| 2018/0359312 | A1* | 12/2018 | Dabell | H04L 67/1023 |
| 2020/0366759 | A1* | 11/2020 | Sinha | G06F 9/5072 |
| 2021/0058453 | A1* | 2/2021 | Balasubramanian | H04L 47/30 |

FOREIGN PATENT DOCUMENTS

| | | |
|---|---|---|
| CN | 104539479 A | 4/2015 |
| CN | 104702439 A | 6/2015 |
| CN | 104734914 A | 6/2015 |
| CN | 106375420 A | 2/2017 |
| CN | 106411639 A | 2/2017 |
| CN | 107770242 A | 3/2018 |

OTHER PUBLICATIONS

Intellectual Property India Examination Report for Application No. 202027007028 dated Mar. 10, 2021 7 pages.

* cited by examiner

METHOD AND APPARATUS FOR REALIZING INTELLIGENT TRAFFIC SCHEDULING, COMPUTER READABLE STORAGE MEDIUM THEREOF AND COMPUTER DEVICE

CROSS-REFERENCE TO RELATED APPLICATIONS

The present application is a national stage entry under 35 U.S.C. § 371 of International Application No. PCT/CN2018/102176, filed on Aug. 24, 2018, which claims priority to Chinese Patent Application No. 201710744272.6 filed to the CNIPA on Aug. 25, 2017 and entitled "METHOD AND APPARATUS FOR REALIZING INTELLIGENT TRAFFIC SCHEDULING," the disclosures of both of which are incorporated herein by reference in their entireties.

The present application claims priority to Chinese Patent Application No. 201710744272.6 filed to the CNIPA on Aug. 25, 2017 and entitled "METHOD AND APPARATUS FOR REALIZING INTELLIGENT TRAFFIC SCHEDULING," the disclosure of which is incorporated herein by reference in its entirety.

TECHNICAL FIELD

The embodiments of the present invention relate to, but are not limited to, the technical field of Internet, and in particular to a method and apparatus for realizing intelligent traffic scheduling, a computer readable storage medium thereof, and a computer device.

BACKGROUND

With the development of the Internet, users have higher and higher requirements for the quality of service of network access, and intelligent traffic scheduling functions are widely used to improve the quality of service and the availability. An intelligent traffic scheduling system functions to realize a traffic distribution between servers in different areas on a local area network (including the Internet) so as to ensure that the best server is used to service the nearest client, thus ensuring the access quality. Generally, the intelligent scheduling system will guide a user to access to the optimal server taking into consideration the network location of the user and the state of the application server, so as to achieve the optimal service effect. The server state is generally detected and acquired by a monitoring server.

The state of the application server acquired by the monitoring server is generally classified into two types. The first type is an operating state (including the utilization rate of a magnetic disk, a load, a memory, or the like). This state is generally detected by a detection agent in the application server. The second type is a network service state (network communication state, port communication state or the like). This state is generally detected by independent monitoring servers in different network areas to obtain the most accurate result of monitoring.

In the existing solutions, according to the network area where the application server of the monitoring target is located, different computer rooms in a same network area, a same region in different network areas, a same ISP or other rules are selected for selection of a monitoring server. In accordance with a certain voting algorithm, the network service state of the application server is determined to determine the availability of the server. It is finally reflected whether the application server will be used during the intelligent traffic scheduling.

In such existing methods, since the monitoring server is selected without reference to the intelligent scheduling coverage scheme configuration, the result of monitoring may not represent the capability of the application server to service a certain network area, so that a fault may not be discovered or a switch may be occurred without failure. Moreover, the result of monitoring is also determined for the application server. The scheduling system acquires the data of the network service state of a certain application server monitored by a monitoring server and then determines, according to all monitored data ad by voting, whether the application server is available, without using a finer granularity and considering that different network areas of the application server will have dimensions of different network characteristics. When the network from an individual network area to the application server is abnormal, the whole application server is directly considered as being unavailable, resulting in inaccurate scheduling results and resource waste.

SUMMARY

In order to solve the above technical problems, the embodiments of the present invention provide a method and apparatus for realizing intelligent traffic scheduling.

An embodiment of the present invention provides a method for realizing intelligent traffic scheduling, including:

determining the distribution of monitoring servers of an application server in one or more service network areas of the application server and in one or more network areas out of the one or more service network areas;

when it is determined that the distribution does not satisfy a preset distribution condition, modifying, according to the distribution, a mapping relationship between the application server and the monitoring servers; and performing monitoring according to the updated mapping relationship, and modifying, according to the result of monitoring, a service network area coverage scheme of the application server.

The method for realizing intelligent traffic scheduling is further characterized in that:

when the preset distribution condition is a condition 1 that the number of monitoring servers in network areas out of the service network areas of the application server is greater than or equal to 0 and the number of monitoring servers in at least one service network area of the application server is less than N, where N is a positive integer greater than 0, the modifying, according to the distribution, a mapping relationship between the application server and monitoring servers includes: adding one or more monitoring servers in a service network area where the number of monitoring servers of the application server is less than N, so that the number of monitoring servers in each service network area of the application server is greater than N; or, adding one or more monitoring servers in a service network area where the number of monitoring servers of the application server is less than N, and deleting one or more monitoring servers in the service network areas out of the service network areas of the application server when the number of monitoring servers in the network areas out of the service network areas of the application server is greater than 0, so that the number of monitoring servers in each service network area of the application server is greater than N.

The method for realizing intelligent traffic scheduling is further characterized in that:

when the preset distribution condition is a condition 2 that a difference between the number of monitoring servers in at least one service network area of the application server and the number of monitoring servers in another service network area is greater than a preset difference, the modifying, according to the distribution, a mapping relationship between the application server and monitoring servers includes: adding one or more monitoring server in at least one service network area of the application server and/or deleting one or more monitoring server in at least one other service network area of the application server, so that a difference in the number of monitoring servers between any two service network areas of the application server is less than the preset difference.

The method for realizing intelligent traffic scheduling is further characterized in that:

when the preset distribution condition is a condition 3 that a variance of the numbers of monitoring servers in various service network areas of the application server is greater than a preset variance value, the modifying, according to the distribution, a mapping relationship between the application server and monitoring servers includes: adding one or more monitoring server in at least one service network area of the application server and/or deleting one or more monitoring server in at least one other service network area of the application server, so that the variance of the numbers of monitoring servers in various service network areas of the application server is less than the preset variance value.

The method for realizing intelligent traffic scheduling is further characterized in that:

the modifying, according to the result of monitoring, a service network area coverage scheme of the application server includes: when the result of monitoring of a service network area of the application server is abnormal operation, replacing the application server in the service network area with a backup application server, or modifying a service network area set of the application server.

The method for realizing intelligent traffic scheduling is further characterized in that:

the method is executed when a monitoring server allocation rationality condition is satisfied, and the satisfying the monitoring server allocation rationality condition includes one of the following situations:

1. the service network area coverage scheme of the application server is initialized;
2. the service network area coverage scheme of the application server is changed;
3. the mapping relationship between the application server and the monitoring servers is changed; and
4. a network area to which a monitoring server belongs is changed.

An embodiment of the present invention further provides an apparatus for realizing intelligent traffic scheduling, including:

a distribution determination module configured to determine the distribution of monitoring servers of an application server in one or more service network areas of the application server and in one or more network areas out of the one or more service network areas;

a determination module configured to determine whether the distribution satisfies a preset distribution condition;

a monitoring server configuration and management module configured to modify, according to the distribution, the setting of monitoring servers of the application server in the service network areas of the application server;

a monitoring module configured to perform monitoring by using the updated setting; and a coverage scheme management module configured to modify, according to the result of monitoring, a service network area coverage scheme of the application server.

The apparatus for realizing intelligent traffic scheduling is further characterized in that:

the monitoring server configuration and management module is configured to: when the determination module determines that the distribution satisfies a condition 1 that the number of monitoring servers in network areas out of the service network areas of the application server is greater than or equal to 0 and the number of monitoring servers in at least one service network area of the application server is less than N, where N is a positive integer greater than 0, modify the mapping relationship between the application server and monitoring servers by the following method: adding one or more monitoring server in a service network area where the number of monitoring servers of the application server is less than N, so that the number of monitoring servers in each service network area of the application server is greater than N; or, adding one or more monitoring server in a service network area where the number of monitoring servers of the application server is less than N, and deleting one or more monitoring server in the service network areas out of the service network areas of the application server when the number of monitoring servers in the network areas out of the service network areas of the application server is greater than 0, so that the number of monitoring servers in each service network area of the application server is greater than N.

The apparatus for realizing intelligent traffic scheduling is further characterized in that:

the monitoring server configuration and management module is configure to: when the determination module determines that the distribution satisfies a condition 2 that a difference between the number of monitoring servers in at least one service network area of the application server and the number of monitoring servers in another service network area is greater than a preset difference, modify the mapping relationship between the application server and monitoring servers by the following method: adding one or more monitoring server in at least one service network area of the application server and/or deleting one or more monitoring server in at least one other service network area of the application server, so that a difference in the number of monitoring servers between any two service network areas of the application server is less than the preset difference.

The apparatus for realizing intelligent traffic scheduling is further characterized in that:

the monitoring server configuration and management module is configured to: when the determination module determines that the distribution satisfies a condition 3 that a variance of the numbers of monitoring servers in various service network areas of the application server is greater than a preset variance value, modify the mapping relationship between the application server and monitoring servers by the following method: adding one or more monitoring server in at least one service network area of the application server and/or deleting one or more monitoring server in at least one other service network area of the application server, so that the variance of the numbers of monitoring servers in various service network areas of the application server is less than the preset variance value.

The apparatus for realizing intelligent traffic scheduling is further characterized in that:

the coverage scheme management module is further configured to modify, according to the result of monitoring, the service network area coverage scheme of the application server by the following method: when the result of monitoring of a service network area of the application server is abnormal operation, replacing the application server in the service network area with a backup application server, or modifying a service network area set of the application server.

The apparatus for realizing intelligent traffic scheduling is further characterized in that:

the apparatus further includes a trigger module configured to trigger the distribution determination module when a monitoring server allocation rationality condition is satisfied, the satisfying the monitoring server allocation rationality condition including one of the following situations:

1. the service network area coverage scheme of the application server is initialized;
2. the service network area coverage scheme of the application server is changed;
3. the mapping relationship between the application server and the monitoring servers is changed; and
4. a network area to which a monitoring server belongs is changed.

Another aspect of the embodiments of the present invention provides a computer readable storage medium storing computer programs that, when executed by a processor, implement the steps of the method described above.

Another aspect of the embodiments of the present invention provides a computer device, including a memory, a processor and computer programs that are stored on the memory and runnable on the processor, the processor implementing the steps of the method described above when executing the programs.

The embodiments of the present invention have the following advantages.

Firstly, the scheduling switching for the granularity of an application server-network area can be implemented, so that the scheduling is more precise and rational, and the network service quality is improved.

Secondly, a new method for determining the distribution rationality of monitoring servers is provided. The network quality of all service network areas of the application server is obtained by the results of monitoring and detection of different network areas. The problem that traffic cannot be switched to a normal server when a single area network is abnormal or the traffic service of a certain network area is abnormally switched when this network area is abnormal in some cases is completely solved.

Other characteristics, features and advantages of the embodiments of the present invention will become apparent upon reading the following description of exemplary embodiments with reference to the accompanying drawings.

BRIEF DESCRIPTION OF THE DRAWINGS

The drawings incorporated into this specification and constituting a part of this specification show the embodiments of the present invention, and are used together with the description to explain the principles of the embodiments of the present invention. Throughout the drawings, similar reference numerals represent similar elements. The drawings to be described hereinafter are some but not all of the embodiments of the present invention. A person of ordinary skill in the art may obtain other drawings according to these drawings without paying any creative effort.

DETAILED DESCRIPTION

To make the objectives, technical solutions and advantages of the embodiments of the present invention clearer, the technical solutions in the embodiments of the present invention will be described clearly and completely with reference to the drawings in the embodiments of the present invention. Apparently, the described embodiments are some but not all of the embodiments of the present invention. All other embodiments obtained by a person of ordinary skill in the art based on the embodiments of the present invention without paying any creative effort shall fall into the protection scope of the embodiments of the present invention. It is to be noted that the embodiments in the present application and the features in the embodiments can be combined in any way if not conflicted.

Figure 1:
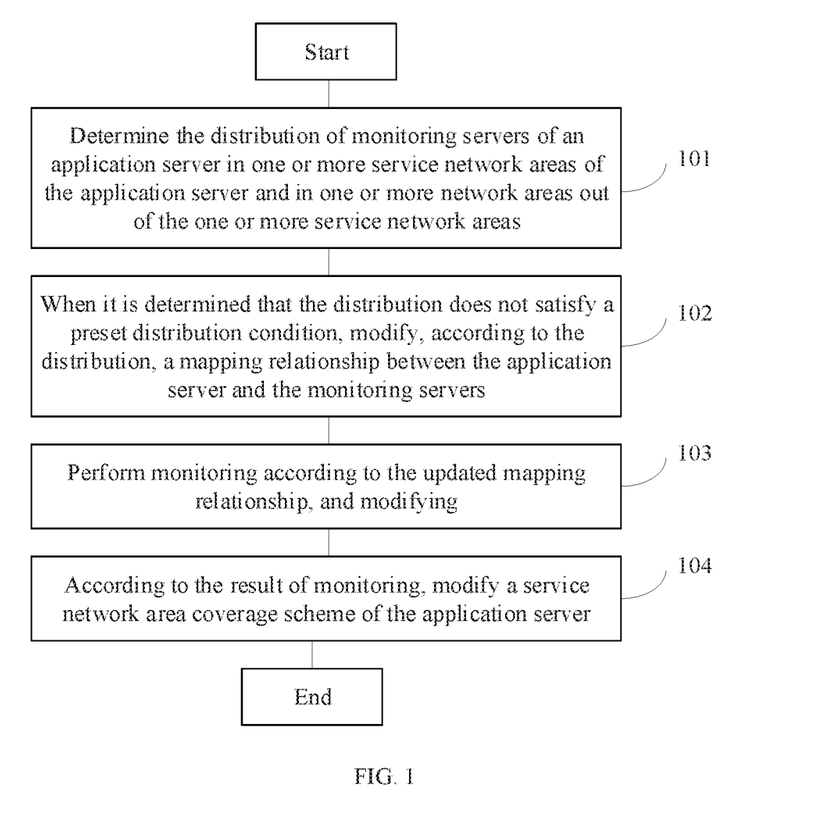
FIG. 1 is a flowchart of a method for realizing intelligent traffic scheduling according to an embodiment.

FIG. 1 is a flowchart of a method for realizing intelligent traffic scheduling according to an embodiment. The method includes the following steps.

Step 101: The distribution of monitoring servers of an application server in one or more service network areas of the application server and in one or more network areas out of the one or more service network areas.

Step 102: When it is determined that the distribution does not satisfy a preset distribution condition, a mapping relationship between the application server and the monitoring servers is modified according to the distribution.

Step 103: Monitoring is performed according to the updated mapping relationship.

Step 104: A service network area coverage scheme of the application server is modified according to the result of monitoring.

Before the method is executed, a process of triggering the method is further included. That is, the method is executed when a monitoring server allocation rationality condition is satisfied. The satisfying the monitoring server allocation rationality condition includes one of the following situations:

1. the service network area coverage scheme of the application server is initialized;
2. the service network area coverage scheme of the application server is changed;
3. the mapping relationship between the application server and the monitoring servers is changed; and
4. a network area to which a monitoring server belongs is changed.

The service network area coverage scheme of the application server refers to the configuration of the corresponding application server in various service network areas. The network area is the network division area of the operator, including the operator and the geographical area, for example, Unicom Beijing, Telecom Shanghai or the like. The service network area of the application server refers to the network area where the application server provides services. For example:

| Service network area | List of application servers |
|---|---|
| Unicom Beijing | IP1, IP2, IP3 |
| Unicom Hebei | IP1 |
| Telecom Shanghai | IP3, IP4 |

The application servers in various service network areas all have backup server(s). For example, the backup server of IP1 is IP10, and the backup server of IP2 is IP20, similar for others.

The mapping relationship between the application server and monitoring severs refers to the correspondence between the application server and the list of monitoring servers for monitoring the application server. For example:

| Application server | Monitoring server |
|---|---|
| IP1 | IPA, IPB |

The network area to which the monitoring server belongs is shown in the following table:

| Monitoring server | Service network area |
|---|---|
| IPA | Unicom Beijing |
| IPB | Telecom Shanghai |

In the step 101, specifically, the distribution in the step 101 is determined according to the service network area coverage scheme of the application server, the mapping relationship between the application server and monitoring servers, and the network area to which each monitoring server belongs.

In accordance with the above example, by taking IP1 as an example, the following table is shown:

| Application server | Service network area | Monitoring server | The number of monitoring servers |
|---|---|---|---|
| IP1 | Unicom Beijing | IPA | 1 |
| | Unicom Hebei | | 0 |
| | Telecom Shanghai | IPB | 1 |

In the step 102, the preset distribution condition includes one of the following conditions.

Condition 1: the number of monitoring servers in network areas out of the service network areas of the application server is greater than or equal to 0 and the number of monitoring servers in at least one service network area of the application server is less than N, where N is a positive integer greater than 0.

Condition 2: a difference between the number of monitoring servers in at least one service network area of the application server and the number of monitoring servers in another service network area is greater than a preset difference.

Condition 3: a variance of the numbers of monitoring servers in various service network areas of the application server is greater than a preset variance value.

When the condition 1 is satisfied, the modifying, according to the distribution, a mapping relationship between the application server and monitoring servers includes: adding one or more monitoring servers in a service network area where the number of monitoring servers of the application server is less than N, so that the number of monitoring servers in each service network area of the application server is greater than N; or, adding one or more monitoring servers in a service network area where the number of monitoring servers of the application server is less than N, and deleting one or more monitoring servers in the network areas out of the service network areas of the application server when the number of monitoring servers in the network areas out of the service network areas of the application server is greater than 0, so that the number of monitoring servers in each service network area of the application server is greater than N.

In the above example, the service network areas of the application server IP1 are Unicom Beijing and Unicom Hebei. The number of monitoring servers corresponding to the application server IP1, in a network area Telecom Shanghai out of the service network areas of the application server IP1, is 1, which is greater than 0, and the number of monitoring servers corresponding to the application server IP1 in a service network area of the application server IP1, Unicom Hebei, is 0 (where the value of N is 1). Thus, a monitoring server IPC may be added in Unicom Hebei or the monitoring server in Telecom Shanghai may be deleted at the same time.

When the condition 2 is satisfied, the modifying, according to the distribution, a mapping relationship between the application server and monitoring servers includes: adding one or more monitoring servers in at least one service network area of the application server and/or deleting one or more monitoring servers in at least one other service network area of the application server, so that a difference in the number of monitoring servers between any two service network areas of the application server is less than the preset difference.

When the condition 3 is satisfied, the modifying, according to the distribution, a mapping relationship between the application server and monitoring servers includes: adding one or more monitoring servers in at least one service network area of the application server and/or deleting one or more monitoring servers in at least one other service network area of the application server, so that the variance of the numbers of monitoring servers in various service network areas of the application server is less than the preset variance value.

In the above example, the result of monitoring in the step 103 is as follows:

| Application server | Monitoring server | The result of monitoring |
|---|---|---|
| IP1 | IPA | Normal |
| | IPC | Abnormal |

In the step 104, the modifying, according to the result of monitoring, a service network area coverage scheme of the application server includes: when the result of monitoring of a service network area of the application server is abnormal operation, replacing the application server in the service network area with a backup application server, or modifying a service network area set of the application server, i.e., deleting, from the service network areas of the application server, the service network area where the result of monitoring is abnormal operation.

According to the result of monitoring, the coverage of IP1 to Unicorn Hebei is abnormal and IP1 is replaced with a backup server IP10. The modified coverage scheme is as follows:

| Service network area | List of application servers |
|---|---|
| Unicom Beijing | IP1, IP2, IP3 |
| Unicom Hebei | IP10 |
| Telecom Shanghai | IP3, IP4 |

Figure 2:
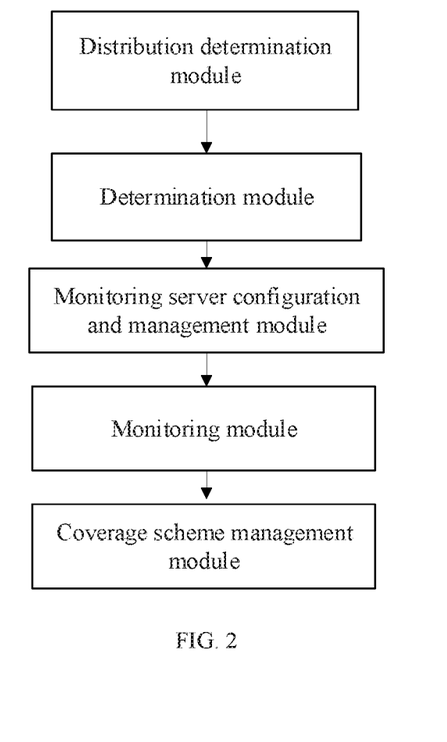
FIG. 2 is a structural diagram of an apparatus for realizing intelligent traffic scheduling according to an embodiment.

FIG. 2 is a structural diagram of an apparatus for realizing intelligent traffic scheduling according to an embodiment. The apparatus includes:

a distribution determination module configured to determine the distribution of monitoring servers of an application server in one or more service network areas of the application server and in one or more network areas out of the one or more service network areas;

a determination module configured to determine whether the distribution satisfies a preset distribution condition;

a monitoring server configuration and management module configured to modify, according to the distribution, the setting of monitoring servers of the application server in the service network areas of the application server;

a monitoring module configured to perform monitoring by using the updated setting; and a coverage scheme management module configured to modify, according to the result of monitoring, a service network area coverage scheme of the application server.

Wherein, when the determination module determines that the distribution satisfies a condition 1 that the number of monitoring servers in network areas out of the service network areas of the application server is greater than or equal to 0 and the number of monitoring servers in at least one service network area of the application server is less than N (where N is a positive integer greater than 0), the monitoring server configuration and management module modifies the mapping relationship between the application server and monitoring servers by the following method: adding one or more monitoring servers in a service network area where the number of monitoring servers of the application server is less than N, so that the number of monitoring servers in each service network area of the application server is greater than N; or, adding one or more monitoring servers in a service network area where the number of monitoring servers of the application server is less than N, and deleting one or more monitoring servers in the network areas out of the service network areas of the application server when the number of monitoring servers in the network areas out of the service network areas of the application server is greater than 0, so that the number of monitoring servers in each service network area of the application server is greater than N.

When the determination module determines that the distribution satisfies a condition 2 that a difference between the number of monitoring servers in at least one service network area of the application server and the number of monitoring servers in another service network area is greater than a preset difference, the monitoring server configuration and management module modifies the mapping relationship between the application server and monitoring servers by the following method: adding one or more monitoring servers in at least one service network area of the application server and/or deleting one or more monitoring servers in at least one other service network area of the application server, so that a difference in the number of monitoring servers between any two service network areas of the application server is less than the preset difference.

When the determination module determines that the distribution satisfies a condition 3 that a variance of the numbers of monitoring servers in various service network areas of the application server is greater than a preset variance value, the monitoring server configuration and management module modifies the mapping relationship between the application server and monitoring servers by the following method: adding one or more monitoring servers in at least one service network area of the application server and/or deleting one or more monitoring servers in at least one other service network area of the application server, so that the variance of the numbers of monitoring servers in various service network areas of the application server is less than the preset variance value.

The coverage scheme management module is further configured to modify, according to the result of monitoring, the service network area coverage scheme of the application server by the following method: when the result of monitoring of a service network area of the application server is abnormal operation, replacing the application server in the service network area with a backup application server, or modifying a service network area set of the application server.

The apparatus further includes a trigger module configured to trigger the distribution determination module when a monitoring server allocation rationality condition is satisfied, the satisfying the monitoring server allocation rationality condition including one of the following situations:

1. the service network area coverage scheme of the application server is initialized;
2. the service network area coverage scheme of the application server is changed;
3. the mapping relationship between the application server and the monitoring servers is changed; and
4. a network area to which a monitoring server belongs is changed.

An embodiment of the present invention further provides a computer readable storage medium storing computer programs that, when executed by a processor, implement the steps of the method described above.

An embodiment of the present invention further provides a computer device, including a memory, a processor and computer programs that are stored on the memory and runnable on the processor, the processor implementing the steps of the method described above when executing the programs.

The embodiments of the present invention have the following advantages.

Firstly, the scheduling switching for the granularity of an application server-network area can be implemented, so that the scheduling is more precise and rational, and the network service quality is improved.

Secondly, a new method for determining the distribution rationality of monitoring servers is provided. The network quality of all service network areas of the application server is obtained by the results of monitoring and detection of different network areas. The problem that traffic cannot be switched to a normal server when a single area network is abnormal or the traffic service of a certain network area is abnormally switched when this network area is abnormal in some cases is completely solved.

The contents described above can be implemented independently or jointly in various ways, and these variants shall fall into the protection scope of the embodiments of the present invention.

It should be understood by a person of ordinary skill in the art that all or some of the steps of the method described above may be implemented by instructing the associated software through programs. The programs may be stored in a computer readable storage medium, such as a read-only memory, a magnetic disk or an optical disk. Optionally, all or some of the steps in the foregoing embodiments may also be implemented by one or more integrated circuits. Accordingly, each module/unit in the foregoing embodiments may be implemented in the form of hardware, or may be implemented in the form of software function modules. The embodiments of the present invention are not limited to any specific form of the combination of hardware and software.

It is to be noted that, as used herein, the term "comprise/comprising," "include/including" or any other variants thereof is intended to encompass a non-exclusive inclusion, so that an object or device including a series of elements not only includes these elements, but also includes other elements not listed clearly, or further includes elements inherent to this object or device. Without more restrictions, an element defined by the phrase "comprising . . . " does not exclude the presence of other identical elements in the object or device including this element.

The foregoing embodiments are merely used for describing the technical solutions of the present invention and not intended to constitute any limitations thereto. The present invention has been described in detail by the preferred embodiments. It should be understood by a person of ordinary skill in the art that, modifications or equivalent replacements can be made to the technical solutions in the embodiments of the present invention without departing from the spirit and scope of the technical solutions of the present invention, and these modifications or equivalent replacements shall fall into the scope defined by the appended claims of the present invention.

INDUSTRIAL APPLICABILITY

The embodiments of the present invention provide a method and apparatus for realizing intelligent traffic scheduling, which can implement the scheduling and switching for the granularity of an application server-network area, so that the scheduling is more precise and rational and the network service quality is improved. Moreover, a new method for determining the distribution rationality of monitoring servers is provided. The network quality of all service network areas of the application server is obtained by the results of monitoring and detection of different network areas. The problem that traffic cannot be switched to a normal server when a single area network is abnormal or the traffic service of a certain network area is abnormally switched when this network area is abnormal in some cases is solved.

The invention claimed is:

1. A method for network traffic scheduling comprising:
   determining a distribution of monitoring servers of an application server in one or more service network areas of the application server and in one or more network areas out of the one or more service network areas;
   in response to determining that the distribution satisfies a preset distribution condition, modifying, according to the distribution, a mapping relationship between the application server and the monitoring servers to obtain an updated mapping relationship;
   performing monitoring according to the updated mapping relationship;
   modifying, according to a result of the monitoring, a service network area coverage scheme of the application server;
   the preset distribution condition is that a number of monitoring servers in each of at least one of the one or more service network areas is less than N, N being a positive integer; and
   modifying the mapping relationship includes adding one or more monitoring servers to each of the at least one of the one or more service network areas so that the number of monitoring servers in each of the one or more service network areas is greater than or equal to N.

2. The method according to claim 1, wherein modifying the mapping relationship further includes, in response to a number of monitoring servers in one of the one or more network areas out of the one or more service network areas being greater than 0, deleting one or more monitoring servers in the one of the one or more network areas out of the one or more service network areas.

3. The method according to claim 1, wherein:
   the one or more service network areas include a plurality of service network areas of the application server; and
   determining the distribution of monitoring servers includes determining a distribution of monitoring servers in the plurality of service network areas and in the one or more network areas out of the plurality of service network areas.

4. The method according to claim 3, wherein:
   the preset distribution condition further includes that a number of monitoring servers in a first service network area of the plurality of service network areas is larger than a number of monitoring servers in a second service network area of the plurality of service network areas by more than a preset difference; and
   modifying the mapping relationship further includes reducing a difference between the number of monitoring servers in the first service network area and the number of monitoring servers in the second service network area by at least one of adding one or more monitoring servers in the second service network area or deleting one or more monitoring server in the first service network area.

5. The method according to claim 3, wherein:
   the preset distribution condition further includes that a variance of numbers of monitoring servers in the plurality of service network areas is greater than a preset variance value; and
   modifying the mapping relationship further includes reducing the variance to be less than the preset variance value by at least one of adding one or more monitoring servers in at least one of the plurality of service network areas or deleting one or more monitoring servers in at least another one of the plurality of service network areas.

6. The method according to claim 1, wherein modifying the service network area coverage scheme includes, in response to the result of the monitoring being abnormal operation, replacing the application server with a backup application server or modifying a service network area set of the application server.

7. The method according to claim 1, further comprising, before determining the distribution:
   determining whether a monitoring server allocation rationality condition is satisfied;
   wherein determining the distribution of monitoring servers includes determining the distribution of monitoring servers in response to determining that the monitoring server allocation rationality condition is satisfied.

8. The method according to claim 7, wherein the monitoring server allocation rationality condition being satisfied includes at least one of:
the service network area coverage scheme being initialized;
the service network area coverage scheme being changed;
the mapping relationship being changed; or
a network area to which a monitoring server belongs being changed.

9. A computer device comprising:
a memory storing a program; and
a processor configured to execute the program to:
determine a distribution of monitoring servers of an application server in one or more service network areas of the application server and in one or more network areas out of the one or more service network area;
in response to determining that the distribution satisfies a preset distribution condition that a number of monitoring servers in each of at least one of the one or more service network areas is less than N that is a positive integer, modify, according to the distribution, a mapping relationship between the application server and the monitoring servers to obtain an updated mapping relationship by adding one or more monitoring servers to each of the at least one of the one or more service network areas so that the number of monitoring servers in each of the one or more service network areas is greater than or equal to N;
perform monitoring according to the updated mapping relationship; and
modify, according to a result of the monitoring, a service network area coverage scheme of the application server.

10. The computer device according to claim 9, wherein the processor is further configured to execute the program to, in response to a number of monitoring servers in one of the one or more network areas out of the one or more service network areas being greater than 0, delete one or more monitoring servers in the one of the one or more network areas out of the one or more service network areas.

11. The computer device according to claim 9, wherein:
the one or more service network areas include a plurality of service network areas of the application server; and
the processor is further configured to execute the program to determine the distribution of monitoring servers by determining a distribution of monitoring servers in the plurality of service network areas and in the one or more network areas out of the plurality of service network areas.

12. The computer device according to claim 11, wherein:
the preset distribution condition further includes that a number of monitoring servers in a first service network area of the plurality of service network areas is larger than a number of monitoring servers in a second service network area of the plurality of service network areas by more than a preset difference; and
the processor is further configured to execute the program to modify the mapping relationship by reducing a difference between the number of monitoring servers in the first service network area and the number of monitoring servers in the second service network area by at least one of adding one or more monitoring servers in the second service network area or deleting one or more monitoring server in the first service network area.

13. The computer device according to claim 11, wherein:
the preset distribution condition further includes that a variance of numbers of monitoring servers in the plurality of service network areas is greater than a preset variance value; and
the processor is further configured to execute the program to modify the mapping relationship by reducing the variance to be less than the preset variance value by at least one of adding one or more monitoring servers in at least one of the plurality of service network areas or deleting one or more monitoring servers in at least another one of the plurality of service network areas.

14. The computer device according to claim 9, wherein the processor is further configured to execute the program to modify the service network area coverage scheme by, in response to the result of the monitoring being abnormal operation, replacing the application server with a backup application server or modifying a service network area set of the application server.

15. The computer device according to claim 9, wherein:
the processor is further configured to execute the program to, before determining the distribution, determine whether a monitoring server allocation rationality condition is satisfied; and
the processor is further configured to execute the program to determine the distribution of monitoring servers in response to determining that the monitoring server allocation rationality condition is satisfied.

16. The computer device according to claim 15, wherein the monitoring server allocation rationality condition being satisfied includes at least one of:
the service network area coverage scheme being initialized;
the service network area coverage scheme being changed;
the mapping relationship being changed; or
a network area to which a monitoring server belongs being changed.

17. A non-transitory computer readable storage medium storing a computer program that, when executed by a processor, causes the processor to:
determine a distribution of monitoring servers of an application server in one or more service network areas of the application server and in one or more network areas out of the one or more service network areas;
in response to determining that the distribution satisfies a preset distribution condition that a number of monitoring servers in each of at least one of the one or more service network areas is less than N that is a positive integer, modify, according to the distribution, a mapping relationship between the application server and the monitoring servers to obtain an updated mapping relationship by adding one or more monitoring servers to each of the at least one of the one or more service network areas so that the number of monitoring servers in each of the one or more service network areas is greater than or equal to N;
perform monitoring according to the updated mapping relationship; and
modify, according to a result of the monitoring, a service network area coverage scheme of the application server.

* * * * *